United States Patent
Horii et al.

(10) Patent No.: US 11,200,256 B2
(45) Date of Patent: Dec. 14, 2021

(54) RECORD REPLICATION FOR MULTI-COLUMN PARTITIONING ON DISTRIBUTED DATABASE SYSTEMS

(71) Applicant: INTERNATIONAL BUSINESS MACHINES CORPORATION, Armonk, NY (US)

(72) Inventors: Hiroshi Horii, Tokyo (JP); Tatsuhiro Chiba, Tokyo (JP); Takeshi Yoshimura, Tokyo (JP); Mikio Takeuchi, Kanagawa (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 314 days.

(21) Appl. No.: 16/381,216

(22) Filed: Apr. 11, 2019

(65) Prior Publication Data

US 2020/0327147 A1 Oct. 15, 2020

(51) Int. Cl.
*G06F 16/00* (2019.01)
*G06F 16/27* (2019.01)
*G06F 16/22* (2019.01)

(52) U.S. Cl.
CPC .......... *G06F 16/278* (2019.01); *G06F 16/221* (2019.01)

(58) Field of Classification Search
CPC ............................ G06F 16/278; G06F 16/221
See application file for complete search history.

(56) References Cited

U.S. PATENT DOCUMENTS

| | | | |
|---|---|---|---|
| 9,052,831 B1* | 6/2015 | Stefani | G06F 3/0619 |
| 2007/0061544 A1* | 3/2007 | Uppala | G06F 16/221 |
| | | | 711/173 |
| 2007/0143261 A1* | 6/2007 | Uppala | G06F 16/245 |
| 2008/0155310 A1* | 6/2008 | Langen | H04L 65/1006 |
| | | | 714/6.12 |
| 2014/0344236 A1 | 11/2014 | Xiao et al. | |
| 2015/0347473 A1 | 12/2015 | Duan et al. | |
| 2016/0292221 A1* | 10/2016 | Clarke | G06F 21/6227 |
| 2019/0095494 A1* | 3/2019 | Bhattacharjee | G06F 11/3086 |
| 2019/0188239 A1* | 6/2019 | Serrano | G06F 9/3001 |
| 2020/0012659 A1* | 1/2020 | Dageville | G06F 16/273 |

(Continued)

OTHER PUBLICATIONS

Nehme, "Automated Partitioning Design in Parallel Database Systems", SIGMOD, Jun. 2011, pp. 1137-1148.

(Continued)

*Primary Examiner* — Shiow-Jy Fan
(74) *Attorney, Agent, or Firm* — Tutunjian & Bitetto, P.C.; Randall Bluestone (57) ABSTRACT

A computer-implemented method for increasing record availability on a distributed database system implementing multiple partitioning strategies includes identifying first processing devices of a distributed database system for storing one or more first records in accordance with multiple partitioning strategies, determining that at least two of the first processing devices are identified for storing a given one of the one or more first records, and selecting one or more new processing devices of the distributed database system for storing the given first record to achieve sufficiently high availability of the given record within the distributed database system.

14 Claims, 8 Drawing Sheets

(56) References Cited

U.S. PATENT DOCUMENTS

2020/0320051 A1* 10/2020 Lee .................... G06F 16/2228

OTHER PUBLICATIONS

Pavlo, "Skew-Aware Automatic Database Partitioning in Shared-Nothing, Parallel OLTP Systems", SIGMOD, May 2012, pp. 61-72.
Gao, "Improving Availability and Performance with Application-Specific Data Replication", IEEE Transactions on KNowledge and Data Engineering, vol. 17, No. 1, Jan. 2005, pp. 106-120.
Zamanian, "Locality-Aware Partitioning in Parallel Database Systems", SIGMOD, Jun. 2015, pp. 17-30.
Nam, "A Graph-Based Database Partitioning Method for Parallel OLAP Query Processing", IEEE 34th International Conference on Data Engineering, Apr. 2018, 12 pages.

* cited by examiner

RECORD REPLICATION FOR MULTI-COLUMN PARTITIONING ON DISTRIBUTED DATABASE SYSTEMS

BACKGROUND

The present invention generally relates to database management, and more particularly to record replication for multi-column partitioning on distributed database systems.

Database replication refers to a process of copying data from a database to replicas, which can improve availability and/or fault tolerance. One example of a database is a relational database. Relational databases are generally created for deployment on single servers and rely on a master/replica model. In the master/replica model, a master is available for updating data and, if the master fails, a replica is assigned as a new master. This master/replica model can introduce single points of failure.

SUMMARY

In accordance with an embodiment of the present invention, a system for increasing record availability on a distributed database system implementing multiple partitioning strategies is provided. The system includes a memory device for storing program code and at least one processor device operatively coupled to the memory device. The at least one processor device is configured to execute program code stored on the memory device to identify first processing devices of a distributed database system for storing one or more first records in accordance with multiple partitioning strategies, determine that at least two of the first processing devices are identified for storing a given one of the one or more first records, and select one or more new processing devices of the distributed database system for storing the given first record to achieve sufficiently high availability of the given record within the distributed database system.

In accordance with another embodiment of the present invention, a computer-implemented method for implementing multi-column partitioning on distributed database systems is provided. The method includes identifying first processing devices of a distributed database system for storing one or more first records in accordance with multiple partitioning strategies, determining that at least two of the first processing devices are identified for storing a given one of the one or more first records, and selecting one or more new processing devices of the distributed database system for storing the given first record to achieve sufficiently high availability of the given record within the distributed database system.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

As used herein, a partitioning strategy refers to a strategy that identifies a processing device (e.g., a server) in a group or cluster of processing devices (e.g., within a distributed database system) that can store a record. If multiple partitioning strategies are used such that there are N partitioning strategies, a record will be stored in at least one processing device, and in at most N processing devices. Partitioning strategies can be implemented to, for example, manage locations of records by relaying a request from a client to a server (that actually stores a record), manage locations of records using a catalog server that provides each client with routing tables, etc.

As used herein, a highly available record is a record that is stored in a sufficient number of processing devices (e.g., servers) within a group of processing devices to achieve a sufficient amount of availability. That is, a record is highly available if it can satisfy a threshold amount of availability within a system. For example, the threshold can represent a minimum number of processing devices to guarantee a given fault tolerance. More specifically, a record can be a highly available record guaranteeing k-fault tolerance if it is stored in at least k processing devices if all of the processing devices are active. A non-highly available record is a record that is not highly available, such that it is stored in an insufficient number of processing devices (e.g., that it is stored in an insufficient number of processing devices to guarantee a given fault tolerance). For example, a record is not highly available if it is stored in less than k processing devices to guarantee k-fault tolerance.

As used herein, column partitioning refers to an implementation of a partitioning strategy that can use a column value of a record to identify a processing device among a group of processing devices for storage of the record. For example, given a hash function H, a processing device in a group of N processing devices can be identified by searching for a processing device that has an ID "H(ColumnValue) % N".

The embodiments described herein can be used to replicate records allocated to a processing device (e.g., server) with multiple partitioning columns using multiple column ("multi-column") partitioning, such that records can be stored with multiple partitioning strategies. Multi-column partitioning performed in accordance with the embodiments described herein can provide improvements to database functionality. For example, multi-column partitioning performed in accordance with the embodiments described herein can reduce aggregation cost (e.g., queries with different columns can be processed without aggregation) and improve data locality in queries while reducing redundancies, thereby improving database query performance and increasing data availability.

The embodiments described herein can be used to implement high availability database systems storing highly available records. High availability can be achieved in accordance with the embodiments described herein by identifying processing devices in advance for storing a record based on multiple partitioning strategies. High availability database systems in accordance with the embodiments described herein can maintain continuous normal operation during hardware or network failures, can eliminate single points of failure and/or guarantee k-fault tolerance, and can reduce or eliminate end-user service interruption or degradation.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 1:
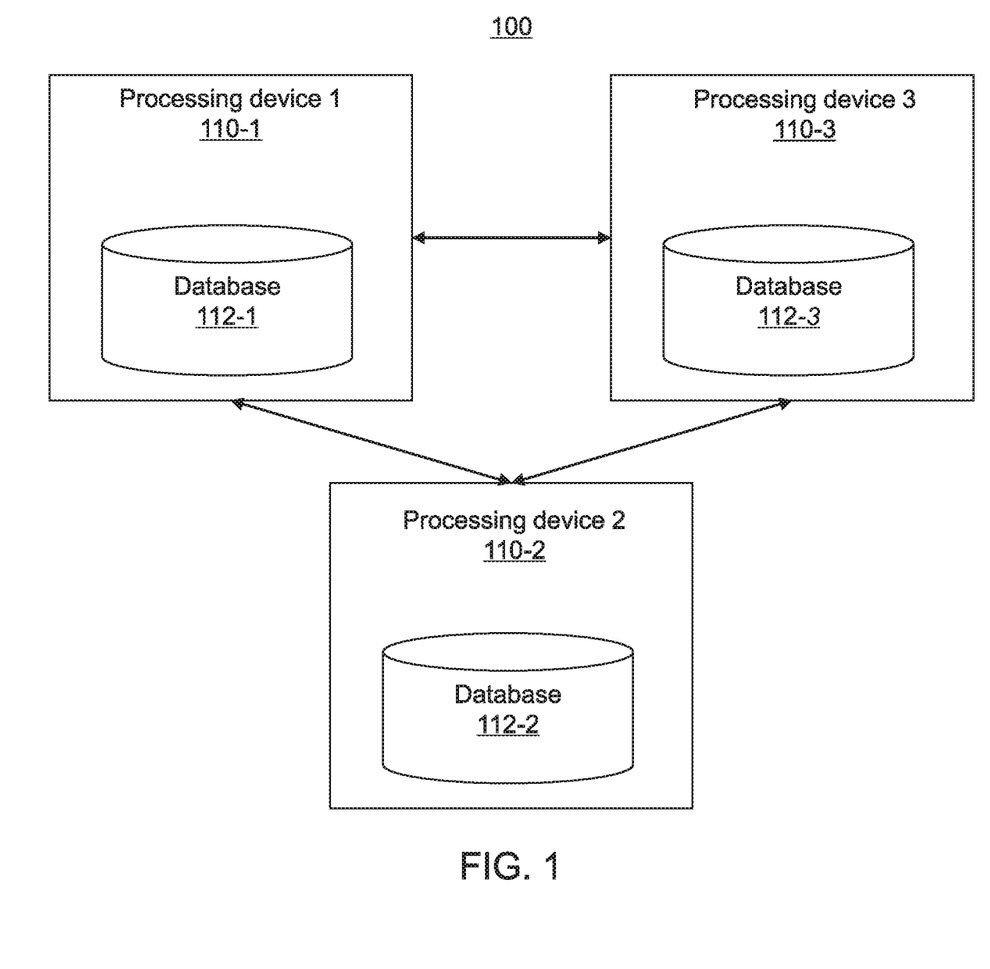
FIG. 1 is a block diagram of a distributed database system, in accordance with an embodiment of the present invention.

Referring now to the drawings in which like numerals represent the same or similar elements and initially to FIG. 1, a block diagram is provided illustrating an exemplary distributed database system 100. For example, the distributed database system can correspond to high availability ("HA") database system. As shown, the system 100 can include a plurality of processing devices (e.g., servers), including processing devices 110-1 through 110-3 including databases 112-1 through 112-3, respectively. Although three processing devices are shown in FIG. 1, the system 100 can include any suitable number of processing devices in accordance with the embodiments described herein. and a computing device 120 in communication via at least one communication network 130. The computing device 120 can include a processor 122 operatively coupled to a memory 124 configured to implement operations within the system 100.

In distributed database systems such as, e.g., system 100, partitioning strategy can used to achieve high performance processing. Records can be allocated to the plurality of database processing devices 110-1 through 110-3, and each of the plurality of processing devices 110-1 through 110-3 can evaluate the records allocated thereto. If multiple ones of the plurality of database processing devices 110-1 through 110-3 evaluate records to process a query, at least one of the other plurality of database processing devices 110-1 through 110-3 may need to aggregate the results of the evaluation. Thus, if a query can be processed by a single one of the plurality of database processing devices 110-1 through 110-3, query processing overhead can be reduced by eliminating the need for the "aggregating" processing device to aggregate the results of the evaluation.

Generally, multi-column partitioning using multiple partitioning strategies can reduce aggregation cost (e.g., queries with different columns can be processed without aggregation). Additionally, multi-column partitioning can duplicate data. As will be described in further detail below, the system 100 can implement multi-column partitioning using multiple partitioning strategies on duplicated data of distributed database servers, to reduce query processing overhead, thereby improving the query processing performance of the system 100. For example, multi-column partitioning can reduce aggregation cost (e.g., queries with different columns can be processed without aggregation).

Figure 2:
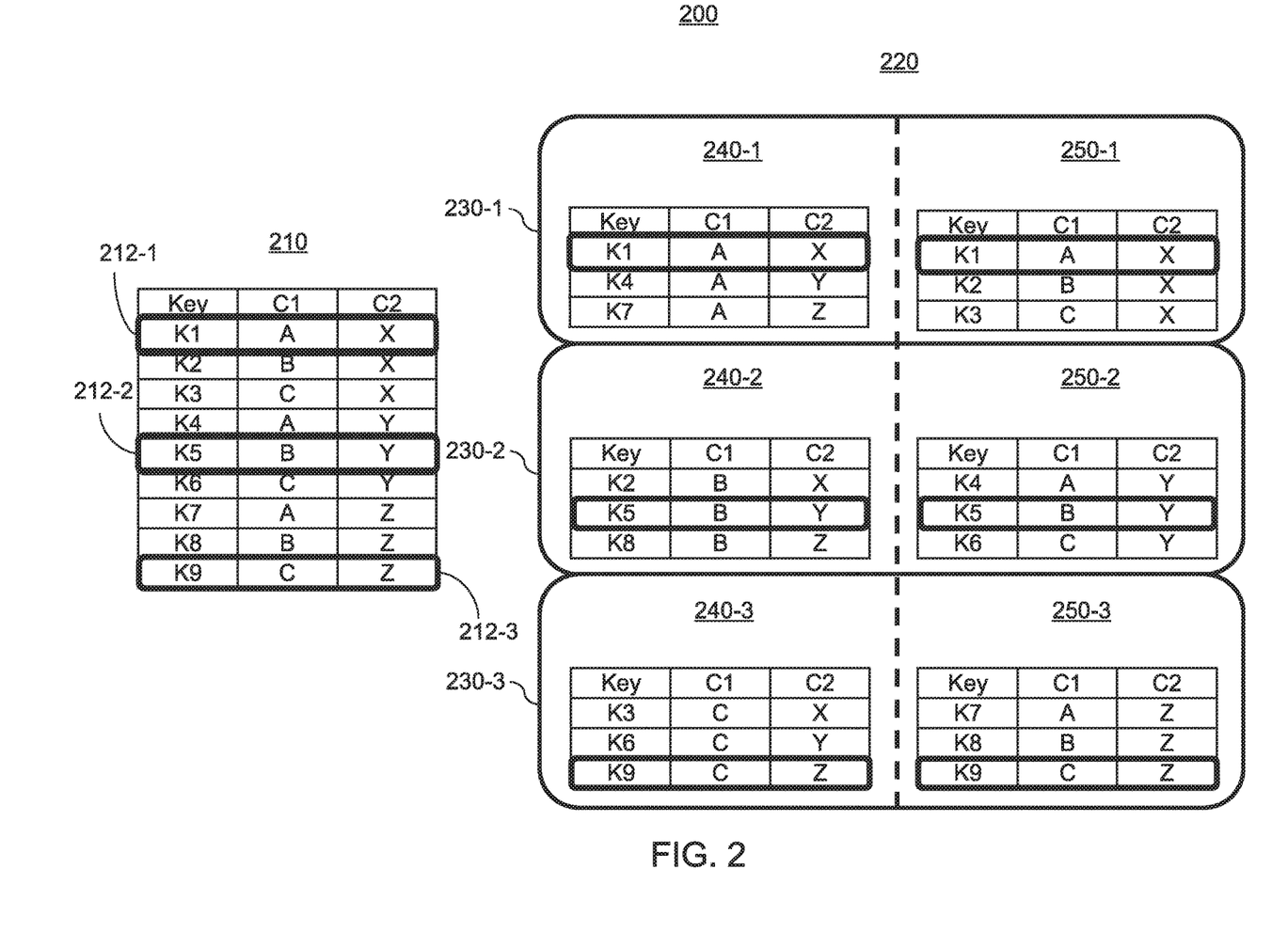
FIG. 2 is a diagram of an example of multi-column partitioning, in accordance with an embodiment of the present invention.

With reference to FIG. 2, a diagram 200 is provided illustrating data duplication with a multiple column partitioning strategy.

An original table 210 is shown, where each record in the original table includes a key value, a first column (C1) value and a second column (C2) value. For example, nine keys K1 through K9 are included in the original table 202, with each of the keys K1 through K9 having a corresponding C1 value (e.g., A, B or C) and a C2 value (e.g., X, Y or Z).

The diagram 200 further shows a system 220. The system 220 can be a distributed database system including a plurality of processing devices (e.g., servers), including processing devices 230-1, 230-2 and 230-3. Each of the processing devices 230-1 through 230-3 can include columns corresponding to partitions stored thereon. For example, the processing devices 230-1 through 230-3 can include C1 partitions 240-1 through 240-3, respectively, and C2 partitions 250-1 through 250-3, respectively.

Consider a partitioning strategy C1 for the original table 210. The records that have the same value in column C1 are allocated in a processing device. If a query requests records with a filter of a C1 value (e.g., SELECT*WHERE C1='A'), the processing device 230-1 can process the query. On the other hand, to process a query with a filter of a C2 value (e.g., "SELECT*WHERE C2=Y"), all of the processing devices can evaluate their records, and at least one of the processing devices can aggregate the filtered records.

The system 220 can partition its records with multiple partitioning strategies (e.g., at least two partitioning strategies). For example in the above, two partitioning strategies C1 and C2 can co-exist with duplicating records. If a query filters records with a column C2 (e.g., "SELECT*WHERE C2=Y"), only processing device 230-2 can evaluate the query. In the system 220, a record can be stored in at most two processing devices (e.g., a record corresponding to key K2 can be stored in processing devices 230-1 and 230-2). As mentioned above, multi-column partitioning using multiple partitioning strategies can reduce aggregation cost (e.g., queries with different columns can be processed without aggregation). Additionally, multi-column partitioning can duplicate data. Though record duplication may not be efficient for storing "big data," record duplication can increase data availability. For example, if two processing devices store a record, the record can be available if one of the two processing devices is available.

Illustratively, a record can be identified as a not HA record based on the two partitioning strategies C1 and C2 of column-partitioning with two hash function H1 and H2 as follows: If a record includes V1 and V2 for two column-partitioning and H1(V1) and H2(V2) is the same, then record is not HA.

As shown in FIG. 2, records 212-1 through 212-3, corresponding to key values K1, K5 and K9 of original table 210, respectively, are identified as not being HA records. This is because the two partitioning strategies C1 and C2 have allocated each of the records 212-1 through 212-3 to only one of the processing devices 230-1 through 230-3. More specifically, the two partitioning strategies C1 and C2 have allocated the record 212-1 to the processing device 230-1 only, the record 212-2 to the processing device 230-2 only, and the record 212- to the processing device 230-3 only. Accordingly, multiple partitioning schemes can, in some instances, result in some records not being HA records.

However, as will now be described below with reference to FIG. 3, the availability of the records 212-1 through 212-3 can be increased to achieve a sufficiently high availability in accordance with the embodiments described herein.

Figure 3:
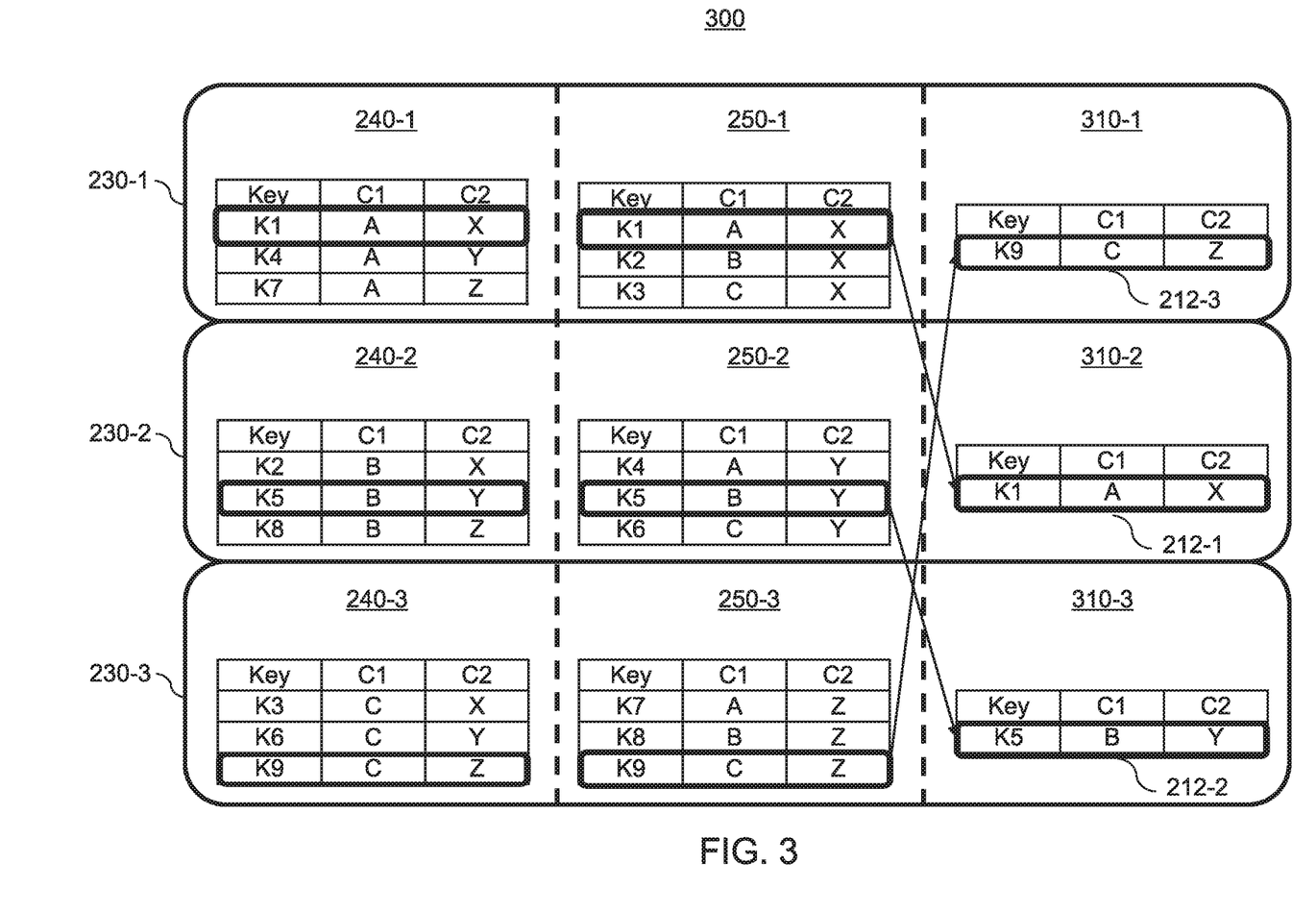
FIG. 3 is a diagram of an example of increasing record availability on a distributed database system implementing multiple partitioning strategies, in accordance with an embodiment of the present invention.

With reference to FIG. 3, a diagram is provided illustrating an example of increasing record availability on a distributed database system 300 implementing multiple partitioning strategies.

As shown, the system 300 can include a plurality of processing devices (e.g., servers), including the processing devices 230-1 through 230-3 described in FIG. 2. Each of the processing devices 230-1 through 230-3 can include columns corresponding to partitions. For example, in addition to the C1 partitions 240-1 through 240-3 and the C2 partitions 250-1 through 250-3 described above in FIG. 2, each of the processing devices 230-1 through 230-3 can include backup partitions 310-1 through 310-3, respectively. The backup partitions 310-1 through 310-3 store respective ones of the records 212-1 through 212-3 identified as being not HA records, as described above with reference to FIG. 2. In this illustrative example, backup partition 310-1 stores record 212-3, backup partition 310-2 stores record 212-1 and backup partition 310-3 stores record 212-2. However, this arrangement is purely exemplary, and the records 212-1 through 212-3 can be stored in any suitable combination of the backup partitions 310-1 through 310-3 in accordance with the embodiments described herein.

The processing devices 230-1 through 230-3 identified for storing not HA records can be identified by applying a hash function to column values. For example, the processing devices 230-1 through 230-3 identified for storing not HA records can be identified by searching for a processing device that has an ID "H(ColumnValue) % N".

Records can be stored and/or read from the system 300 for record processing with increasing availability and performance, as will now be described in further detail below with reference to FIGS. 4 and 5.

Figure 4:
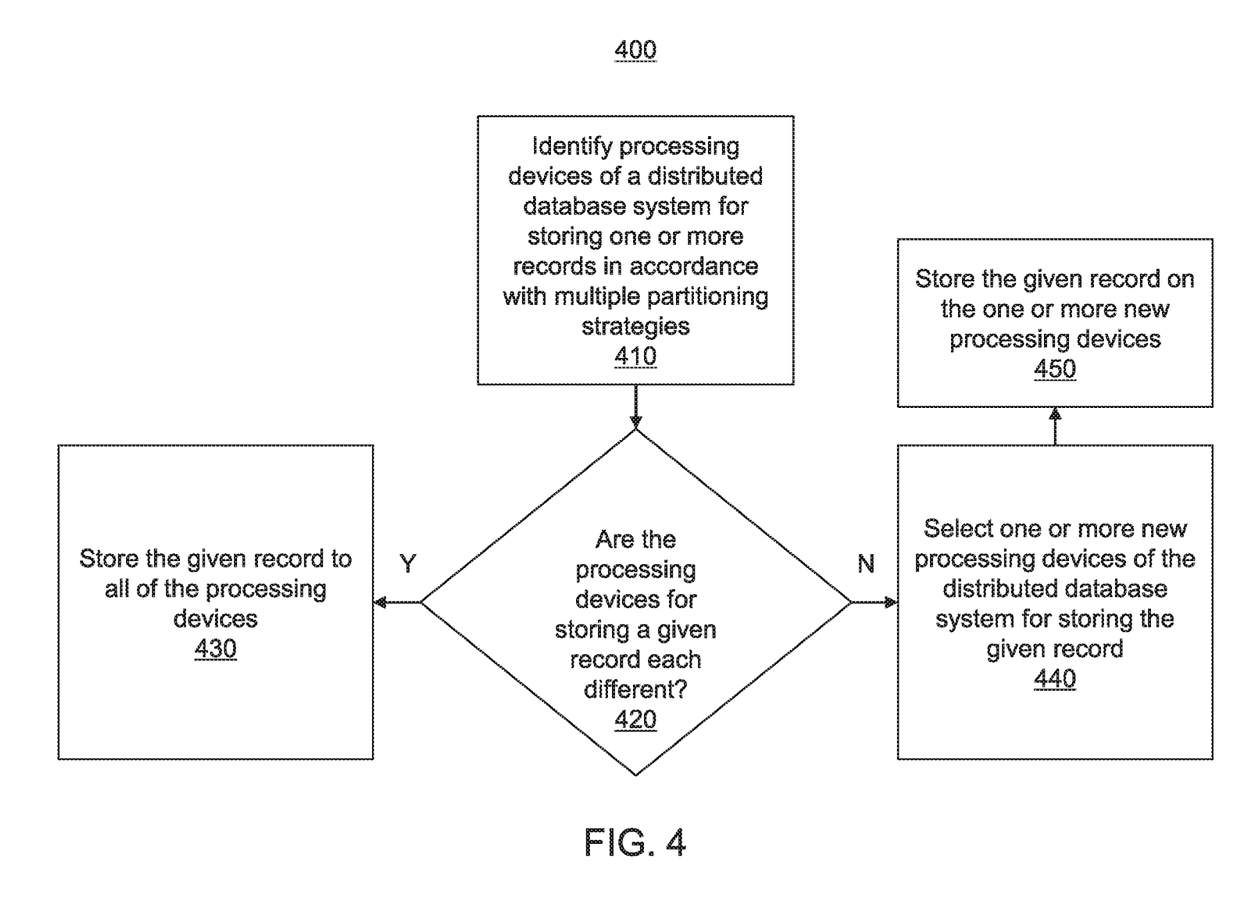
FIG. 4 is a block/flow diagram of a system/method for record storage on a distributed database system, in accordance with an embodiment of the present invention.

With reference to FIG. 4, a block/flow diagram is provided illustrating a system/method 400 for storing records within a distributed database system. The system/method 400 can be performed for increasing record availability on a distributed database system implementing multiple partitioning strategies.

At block 410, processing devices of a distributed database system for storing one or more records in accordance with multiple partitioning strategies are identified. The processing devices can include, e.g., servers.

At block 420, it is determined whether the processing devices for storing a given one of the one or more records are each different.

If the processing devices identified for storing the given record are each different, this means that the multiple partitioning strategies have provided sufficiently high-availability for the given record in the distributed database system. Therefore, at block 430, the one or more records can be stored to all of the processing devices.

However, if the processing devices identified for storing the given record are not each different (e.g., if at least two of the processing devices are identified for storing the given record), this means that the given record may not have a sufficiently high availability in the distributed database system due to allocation to an insufficient number of processing devices. For example, it can be determined that the number of unique processing devices identified for storing the given record in accordance with the multiple partitioning strategies does not satisfy a fault-tolerance requirement of the distributed database system (e.g., a k-fault-tolerance requirement). Therefore, at block 440, one or more new processing devices of the distributed database system can be selected for storing the given record. The one or more new processing devices are selected to achieve sufficiently high availability of the given record within the distributed database system. For example, a new processing device can be selected deterministically for partitioning keys in a record. The one or more new processing devices can be selected for storing the one or more records based on values of columns that determine processing devices.

As mentioned above, the number of unique or different processing devices that are needed to store a given record with sufficiently high availability can depend on the fault-tolerance requirement (e.g., k-fault-tolerance requirement) of the system. For example, if there are three processing devices and if 2-fault-tolerance is needed, a given record needs to be stored on each of the three processing devices. However, if 1-fault-tolerance is needed, the given record only needs to be stored on two of the three processing devices.

At block 450, the given record can be stored on the one or more new processing devices. For example, the given record can be replicated onto the one or more new processing devices.

The system/method 400 of FIG. 4 can be employed in a variety of different contexts. For example, the system/method 400 can be implemented during a pre-storage phase in which a plan for storing records is created to provide sufficiently high availability for the records. As another example, the system/method 400 can be implemented during a post-storage phase in which locations where a record is already stored can be modified to support a sufficiently high available for the record.

Figure 5:
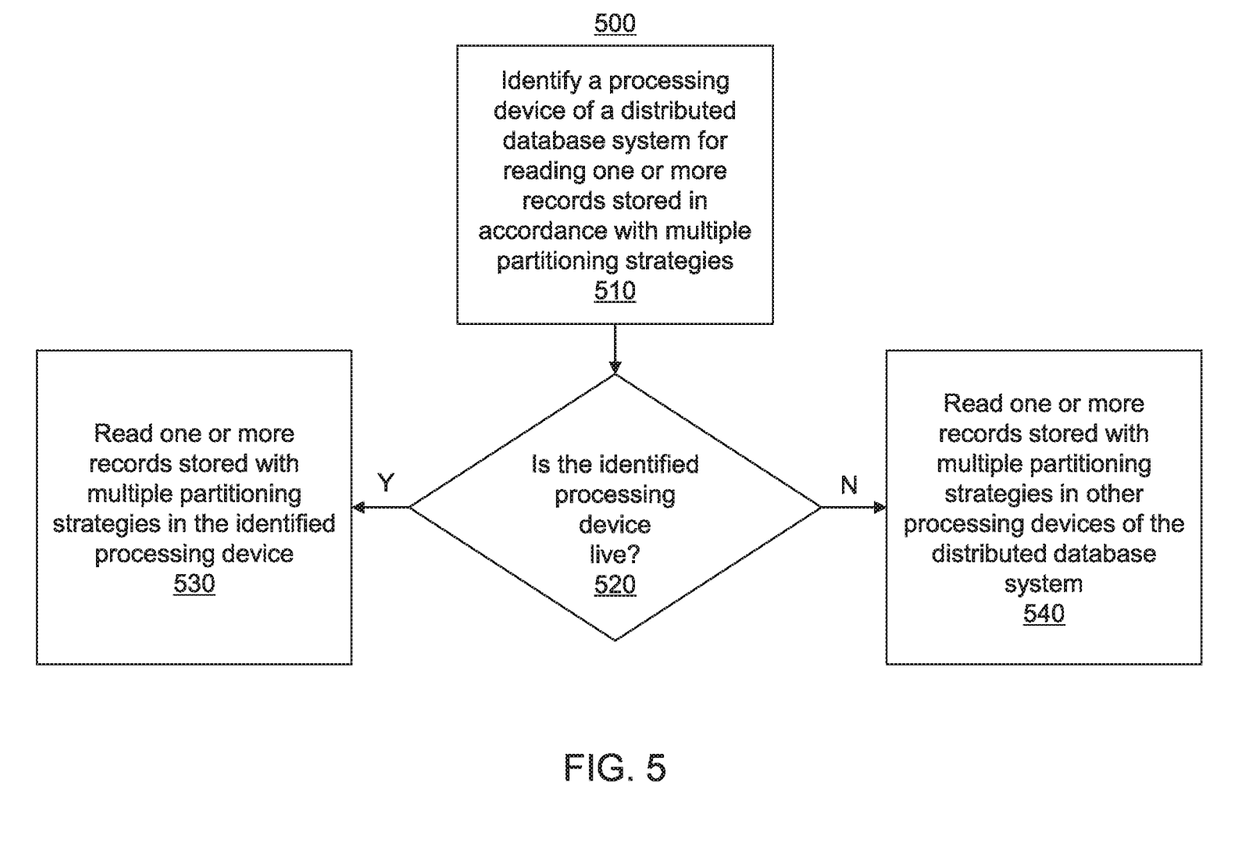
FIG. 5 is a block/flow diagram of a system/method for record reading on a distributed database system, in accordance with an embodiment of the present invention.

With reference to FIG. 5, a block/flow diagram is provided illustrating a system/method 500 for reading records within a distributed database system. The system/method 500 can be performed to read records with multiple partitioning strategies, with increasing availability and performance for record processing.

At block 510, a processing device (e.g., server) of a distributed database system for reading one or more records stored in accordance with multiple partitioning strategies is identified. The processing device for reading the one or more records can be identified based on a value of a partitioning column (when the record is read with the value).

At block 520, it is determined whether the identified processing device is live.

If the identified processing device is live, then one or more records stored with multiple partitioning strategies in the identified processing device are read at block 530.

If the identified processing device is determined to not be live ("dead"), at block 540, one or more records stored with multiple partitioning strategies in other processing devices of the distributed database system are read.

Figure 6:
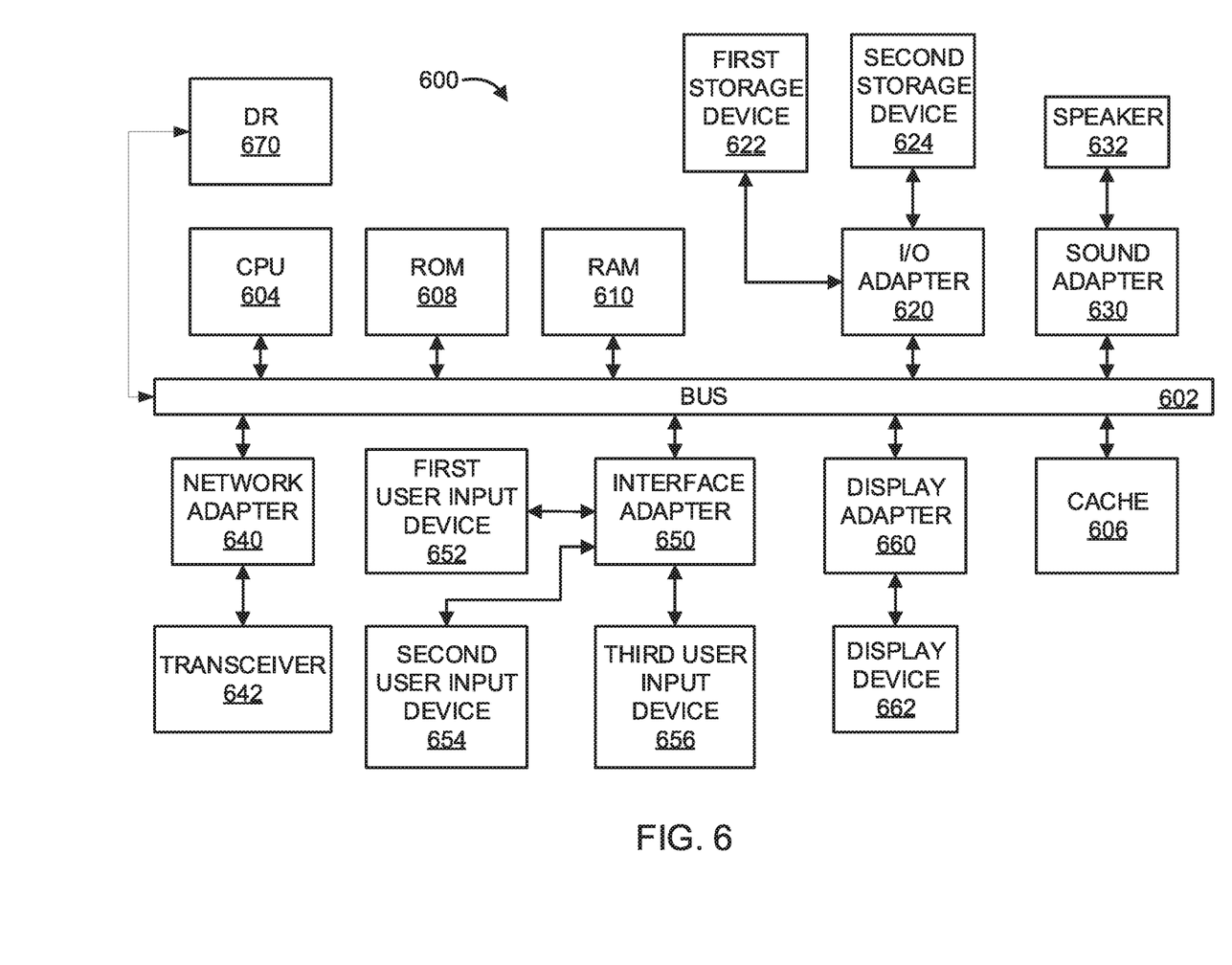
FIG. 6 is a block diagram of a processing system, in accordance with an embodiment of the present invention.

With reference to FIG. 6, an exemplary processing system 600 to which the present invention may be applied is shown in accordance with one embodiment. The processing system 600 includes at least one processor (CPU) 604 operatively coupled to other components via a system bus 602. A cache 606, a Read Only Memory (ROM) 608, a Random Access Memory (RAM) 610, an input/output (I/O) adapter 620, a sound adapter 630, a network adapter 640, a user interface adapter 650, and a display adapter 660, are operatively coupled to the system bus 602.

A first storage device 622 and a second storage device 624 are operatively coupled to system bus 602 by the I/O adapter 620. The storage devices 622 and 624 can be any of a disk storage device (e.g., a magnetic or optical disk storage device), a solid state magnetic device, and so forth. The storage devices 622 and 624 can be the same type of storage device or different types of storage devices.

A speaker 632 is operatively coupled to system bus 602 by the sound adapter 630. A transceiver 642 is operatively coupled to system bus 602 by network adapter 440. A display device 662 is operatively coupled to system bus 602 by display adapter 660.

A first user input device 652, a second user input device 654, and a third user input device 656 are operatively coupled to system bus 602 by user interface adapter 650. The user input devices 652, 654, and 656 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 652, 654, and 656 can be the same type of user input device or different types of user input devices. The user input devices 652, 654, and 656 are used to input and output information to and from system 600.

Data replication (DR) component 670 may be operatively coupled to system bus 602. DR component 670 is configured to sample formulations within a formulation generation system as described above. DR component 670 can be implemented as a standalone special purpose hardware device, or may be implemented as software stored on a storage device. In the embodiment in which DR component 670 is software-implemented, although shown as a separate component of the computer system 600, DR component 670 can be stored on, e.g., the first storage device 622 and/or the second storage device 624. Alternatively, DR component 670 can be stored on a separate storage device (not shown).

Of course, the processing system 600 may also include other elements (not shown), as readily contemplated by one of skill in the art, as well as omit certain elements. For example, various other input devices and/or output devices can be included in processing system 600, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 600 are readily contemplated by one of ordinary skill in the art given the teachings of the present invention provided herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
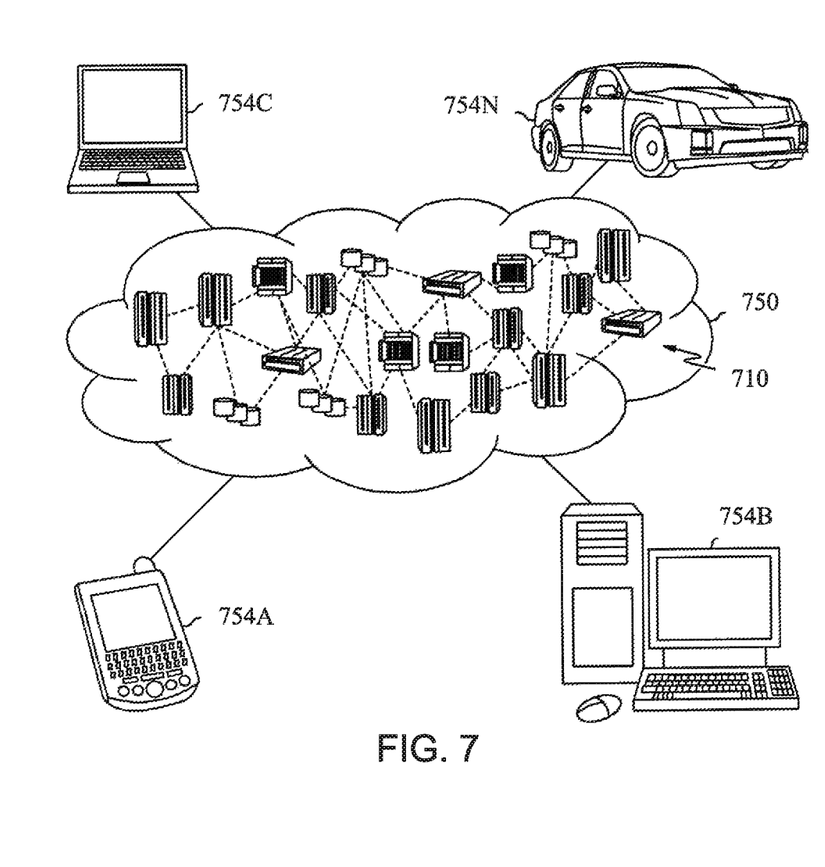
FIG. 7 is a block diagram of an illustrative cloud computing environment having one or more cloud computing nodes with which local computing devices used by cloud consumers communicate, in accordance with an embodiment of the present invention.

Referring now to FIG. 7, illustrative cloud computing environment 750 is depicted. As shown, cloud computing environment 750 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
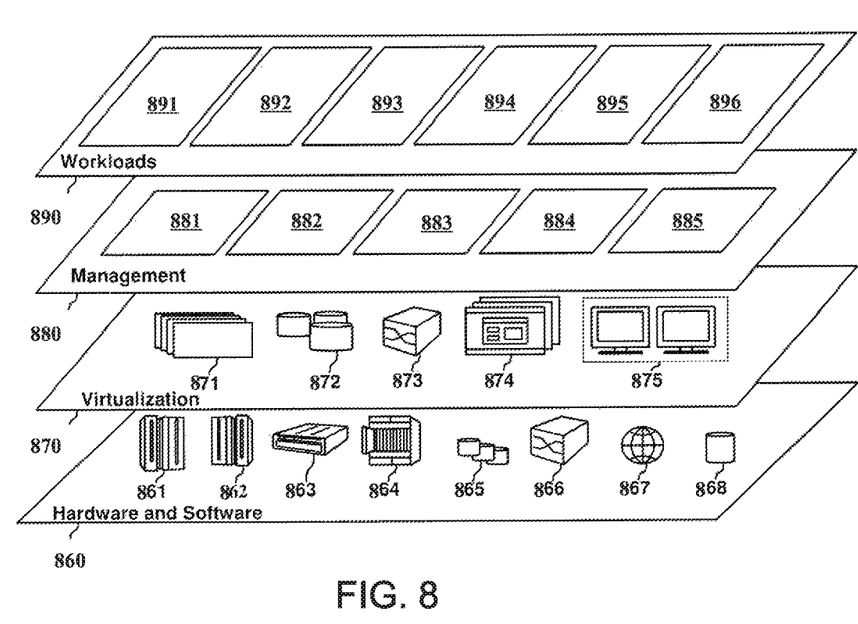
FIG. 8 is a block diagram of a set of functional abstraction layers provided by a cloud computing environment, in accordance with an embodiment of the present invention.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud computing environment for consumers and system administrators. Service level management 684 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and data replication processing 896.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having described preferred embodiments of systems and methods of increasing record availability on a distributed database system implementing multiple partitioning strategies (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claim.

What is claimed is:

1. A system for increasing record availability on a distributed database system implementing multiple partitioning strategies, comprising:
    a memory device for storing program code; and
    at least one processor device operatively coupled to the memory device and configured to execute program code stored on the memory device to:
        identify first processing devices of a distributed database system for storing one or more first records in accordance with multiple partitioning strategies, each of the multiple partitioning strategies identifying a respective one of the first processing devices in a respective partitioning column of multiple partitioning columns;
        determine that at least two of the first processing devices are identified for storing a given one of the one or more first records;
        select one or more new processing devices of the distributed database system for storing the given first record to achieve sufficiently high availability of the given record within the distributed database system; and identify a second processing device of the distributed database system for reading one or more second records with multiple partitioning strategies by reading a value of a partitioning column.

2. The system of claim 1, wherein the one or more new processing devices are selected to achieve sufficiently high availability based on a fault tolerance requirement of the distributed database system.

3. The system of claim 1, wherein the at least one processor device is further configured to execute program code stored on the memory device to determine that the second processing device is alive.

4. The system of claim 3, wherein the at least one processor device is further configured to execute program code stored on the memory device to read the one or more second records from the second processing device.

5. The system of claim 1, wherein the at least one processor device is further configured to execute program code stored on the memory device to determine that the second processing device is dead.

6. The system of claim 5, wherein the at least one processor device is further configured to execute program code stored on the memory device to read the one or more second records in other processing devices of the distributed database system.

7. A computer-implemented method for increasing record availability on a distributed database system implementing multiple partitioning strategies, comprising:

identifying first processing devices of a distributed database system for storing one or more first records in accordance with multiple partitioning strategies, each of the multiple partitioning strategies identifying a respective one of the first processing devices in a respective partitioning column of multiple partitioning columns;

determining that at least two of the first processing devices are identified for storing a given one of the one or more first records;

selecting one or more new processing devices of the distributed database system for storing the given first record to achieve sufficiently high availability of the given record within the distributed database system; and identifying a second processing device of the distributed database system for reading one or more second records with multiple partitioning strategies by reading a value of a partitioning column.

8. The method of claim 7, wherein the one or more new processing devices are selected to achieve sufficiently high availability based on a fault tolerance requirement of the distributed database system.

9. The method of claim 7, further comprising:
determining that the second processing device is alive; and
reading the one or more second records from the second processing device.

10. The method of claim 7, further comprising:
determining that the second processing device is dead; and
reading the one or more second records in other processing devices of the distributed database system.

11. A computer program product comprising a non-transitory computer readable storage medium having program instructions embodied therewith, the program instructions executable by a computer to cause the computer to perform a method for increasing record availability on a distributed database system implementing multiple partitioning strategies, the method performed by the computer comprising:

identifying first processing devices of a distributed database system for storing one or more first records in accordance with multiple partitioning strategies, each of the multiple partitioning strategies identifying a respective one of the first processing devices in a respective partitioning column of multiple partitioning columns;

determining that at least two of the first processing devices are identified for storing a given one of the one or more first records;

selecting one or more new processing devices of the distributed database system for storing the given first record to achieve sufficiently high availability of the given record within the distributed database system; and identify a second processing device of the distributed database system for reading one or more second records with multiple partitioning strategies by reading a value of a partitioning column.

12. The computer program product of claim 11, wherein the one or more new processing devices are selected to achieve sufficiently high availability based on a fault tolerance requirement of the distributed database system.

13. The computer program product of claim 11, wherein the method further includes:
determining that the second processing device is alive; and
reading the one or more second records from the second processing device.

14. The computer program product of claim 11, wherein the method further includes:
determining that the second processing device is dead; and
reading the one or more second records in other processing devices of the distributed database system.

* * * * *